UNITED STATES PATENT OFFICE.

GUSTAV SCHULTZ, OF BERLIN, GERMANY, ASSIGNOR TO THE ACTIEN-GESELL-SCHAFT FÜR ANILIN FABRIKATION, OF SAME PLACE.

BLUE DYE.

SPECIFICATION forming part of Letters Patent No. 511,653, dated December 26, 1893.

Application filed June 8, 1893. Serial No. 476,992. (Specimens.)

*To all whom it may concern:*

Be it known that I, GUSTAV SCHULTZ, of Berlin, in the Kingdom of Prussia, German Empire, have invented new and useful Improvements in the Production of Blue Dyes; and I do hereby declare that the following is a full, clear, and exact description of the invention, which will enable others skilled in the art to which it appertains to make and use the same.

This invention relates to the production of valuable basic coloring matter. It is founded on the observation that the non-symmetrically mono- or di- alkalized para-diamins or their salts yield, when oxidized together in a suitable solvent with diphenyl-metaphenylenediamin or its homologues, violet blue to blue coloring matters. The reaction takes place between one molecule of the paradiamin derivative and one molecule of the substituted metadiamin, and the yield of coloring matter nearly corresponds with the amount theoretically calculated.

The following example will show in what manner I may practically carry out my invention.

To an alcoholic solution of hydrochloride of dimethylparaphenylenediamin — which may be obtained by reducing 2.5 kilograms hydrochloride of paranitroso-dimethylanilin with zinc powder and hydrochloric acid in about one hundred liters of alcohol and filtering after complete reduction from the unattached zinc power—2.9 kilograms di-paratolyl-metaphenylenediamin are added; after heating to about 70° centigrade a concentrated aqueous solution of 3.75 kilograms crystallized sodium bichromate is poured in; the mixture is kept gently boiling during about one hour; one hundred liters of water and thirty liters of a saturated solution of common salt are then added and, after cooling, the precipitate is collected on a filter, washed with salt solution and finally with a small quantity of cold water. By dissolving in boiling water and filtering, the oxide of chromium is removed and from the dark violet blue solution, the coloring matter is precipitated by means of salt.

The dyestuff forms in dry state a violet-black powder, which dissolves readily in water and in alcohol and is insoluble in ether; on adding concentrated hydrochloric acid to the aqueous solution of the dyestuff a red-brown precipitate is formed and the solution is nearly decolored. Caustic soda lye produces in the aqueous solution of the dyestuff a brown precipitate of the free color-base, the latter being easily soluble in benzene or chloroform.

In strong sulphuric acid the dyestuff dissolves with violet-black color, which on diluting with water changes at first into greenish-blue, then violet, while finally a brown-red precipitate is formed.

The coloring matter dyes mordanted cotton, wool and silk a bright violet-blue shade of great intensity and remarkable fastness.

The general character of the dyestuff obtained is not materially altered by substituting in the aforesaid example for the dimethylparaphenylenediamin other equivalent substances such as diethylparaphenylenediamin or monoethylparaphenylenediamin, or by employing instead of ditolylmetaphenylenediamin the diphenylmetaphenylenediamin.

Having now described my invention, what I claim is—

1. The hereinbefore described improved process for the production of blue basic dyes consisting in the joint oxidation of alkalized derivations of para-phenylenediamin containing one free amido group with di-para-tolyl-metaphenylenediamin in a suitable solvent by means of chromates.

2. The basic dye derived from alkalized para diamins which, dry, is a violet black powder easily soluble in water or alcohol, insoluble in ether; in its aqueous solution concentrated hydrochloric acid produces a red-brown precipitate; by the addition of caustic soda lye to the aqueous dyestuff solution the free color-base is precipitated, which is soluble in benzene or chloroform; in strong sulphuric acid the dyestuff dissolves with violet-black color, which on diluting with water changes at first into greenish-blue, then violet, while finally a brown red precipitate is formed.

In testimony whereof I hereunto set my hand and affix my seal, in the presence of two witnesses, this 19th day of May, A. D. 1893.

GUSTAV SCHULTZ. [L. S.]

Witnesses:
RENHOLD SCHONBRODT,
GUSTAV LUCHT.